United States Patent [19]

Bayyouk et al.

[11] Patent Number: 4,750,864
[45] Date of Patent: Jun. 14, 1988

[54] COMPRESSOR LUBRICATION AND NOISE REDUCTION SYSTEM

[75] Inventors: Jacob A. Bayyouk, Clay; Max P. Waser, Syracuse, both of N.Y.

[73] Assignee: Carrier Corporation, Syracuse, N.Y.

[21] Appl. No.: 856,886

[22] Filed: Apr. 28, 1986

[51] Int. Cl.⁴ .............................................. F04D 29/38
[52] U.S. Cl. ................................... 416/203; 417/372; 184/6.18; 184/31; 366/329
[58] Field of Search ............... 416/203, 200 R, 200 A, 416/201 R, 201 A; 415/88, 119; 184/6.18, 6.16, 31; 417/368, 372; 366/165, 329, 328, 325, 279

[56] References Cited

U.S. PATENT DOCUMENTS

| | | | |
|---|---|---|---|
| 2,697,589 | 12/1954 | Devey | 416/203 |
| 2,784,951 | 3/1957 | Bakewell | 416/203 |
| 2,787,448 | 4/1957 | Fawcett | 416/203 |
| 2,930,522 | 3/1960 | Reichard | 184/6.16 |
| 3,147,914 | 9/1964 | Hatten et al. | 417/363 |
| 3,150,597 | 9/1964 | Steenhagan | 415/88 |
| 3,166,303 | 1/1965 | Chapman | 416/200 |
| 3,182,901 | 5/1965 | Solomon | 417/372 |
| 3,575,530 | 4/1971 | Hall | 416/203 |
| 3,858,685 | 1/1975 | Bono | 184/6.16 |
| 4,004,786 | 1/1977 | Stephens | 416/203 |
| 4,013,273 | 3/1977 | Danyliw | 416/203 |
| 4,086,033 | 4/1978 | Stephan | 417/368 |
| 4,325,674 | 4/1982 | Ljungstrom | 416/203 |
| 4,400,142 | 8/1983 | Ohlson, Jr. | 417/372 |

FOREIGN PATENT DOCUMENTS

| | | | |
|---|---|---|---|
| 101976 | 12/1910 | Fed. Rep. of Germany | 416/203 |
| 1017261 | 10/1957 | Fed. Rep. of Germany | 416/203 |
| 94892 | 3/1939 | Sweden | 416/203 |
| 5695 | of 1911 | United Kingdom | 416/201 |
| 306047 | 8/1971 | U.S.S.R. | 416/203 |
| 361316 | 1/1973 | U.S.S.R. | 416/203 |

Primary Examiner—Robert E. Garrett
Assistant Examiner—John T. Kwon
Attorney, Agent, or Firm—David J. Zobkiw

[57] ABSTRACT

The uncovering of the opening of the oil pickup tube is avoided by preventing the formation of a stable vortex. The prevention of the formation of a stable vortex is achieved by making the paddles of the impeller axially asymmetrical by at least a minimum critical value.

5 Claims, 2 Drawing Sheets

○ IMPELLER OF FIG. 1
○ IMPELLER OF FIG. 2
⊙ IMPELLER OF FIG. 3: $\alpha = 1.75°$
⊗ IMPELLER OF FIG. 3: $\alpha = 3.5°$
● IMPELLER OF FIG. 3: $\alpha = 5.25°$
▲ IMPELLER OF FIG. 4
■ IMPELLER OF FIG. 5

COMPRESSOR LUBRICATION AND NOISE REDUCTION SYSTEM

BACKGROUND OF THE INVENTION

In hermetic compressor units, oil is drawn from a sump by a lubrication pump to provide lubrication to the compressor. It is well known that if the oil in the sump is caused to froth or foam, that there is a reduction in the sound of the unit. Accordingly, an impeller in the form of paddles has been placed on the lubricant pickup tube for foam generation. The presence of paddles has reduced the amount of oil pumped and, on occasion, there has been a unit failure due to inadequate lubrication. The apparent cause of inadequate lubrication is the establishment of a vortex centered at the pump inlet which can uncover the end of the pickup tube so that oil is no longer supplied.

SUMMARY OF THE INVENTION

The symmetry of the forces acting to create and stabilize a vortex can be disturbed by choosing an asymmetrical impeller configuration. The asymmetry, however, must be at least partially axial rather than solely radial. To achieve a high performance at startup and at steady-state operating conditions, the axial symmetry must be above a critical value which will depend upon the specific design. To achieve the asymmetry, the paddles may be canted or skewed with respect to the axis of the pickup tube. Alternatively, or additionally, the paddle structure may be bent to create or increase the asymmetry. For an impeller having a diameter of 1.375 inches the minimum value of axial asymmetry to achieve satisfactory oil pumping performance was determined to be 0.04 to 0.05 inches. The pumping performance is generally the same with further increases in axial asymmetry up to about 0.10 inches which was the limit for assembly without bending. Bending one of the paddles while the other paddle is horizontally disposed increases the radius of the bent paddle, as well as vertically displacing it, which increases the foam generation and thereby reduces the noise of the unit. Employing the teaching of this invention, an oil flow rate of 82% of the flow rate achieved without paddles or an impeller was obtained.

It is an object of this invention to improve oil pump delivery capacity when using an impeller to agitate the oil sump.

It is another object of this invention to prevent the formation of a stable vortex. These objects, and others as will become apparent hereinafter, are accomplished by the present invention.

Basically the impeller is located on the oil pickup tube such that the impeller is asymmetrical with respect to the axis of rotation of the tube. Further, the asymmetry is at least partially axial with respect to the axis of rotation of the tube.

BRIEF DESCRIPTION OF THE DRAWINGS

For a fuller understanding of the present invention, reference should now be made to the following detailed description thereof taken in conjunction with the accompanying drawings wherein.

DESCRIPTION OF THE PREFERRED EMBODIMENT

Figure 1:
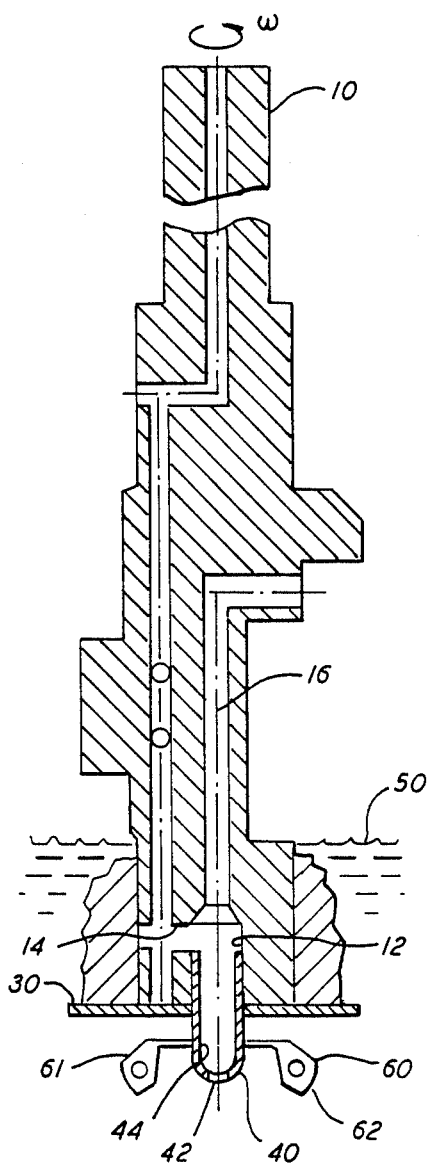
FIG. 1 is a sectional view of the lubrication system of a vertical shaft hermetic refrigerant compressor with a single-stage centrifugal oil pump and a symmetrical impeller.

In FIG. 1 the numeral 10 generally designates a crankshaft which is vertically supported by thrust plate 30 and is rotatably driven about an axis at an angular velocity, $\omega$, by a motor (not illustrated). Pickup tube 40 is force fit in bore 12 of crankshaft 10 coaxial with the axis of rotation of the crankshaft 10 and extends through thrust plate 30 beneath the surface 50 of the oil sump. Pickup tube 40 has an inlet 42 communicating with bore 44 for delivering oil from the sump to bore 12 where centrifugal forces tend to direct the oil radially outward into radial bore 14 for delivery to the parts requiring lubrication while the separated entrained refrigerant gas passes through axial bore 16 to vent. An impeller 60 having paddles 61 and 62 is force fit on pickup tube 40 and is beneath the quiescent surface 50 of the sump. With the impeller 60 placed symmetrically upon pickup tube 40, as illustrated in FIG. 1, the rotation of crankshaft 10 pickup tube 40 and impeller 60, as a unit, results in an insufficient amount of lubricant being pumped as indicated by curve A of FIG. 6.

Figure 2:
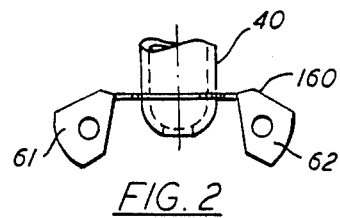
FIG. 2 is a view of a first modified FIG. 1 impeller which has been mounted on the pickup tube and symmetrically bent to increase the radius of the impeller.

The diameter of the impeller 60 of FIG. 1 was 1.270 inches. When the paddles 61 and 62 of impeller 60 are symmetrically bent radially outward, as illustrated in FIG. 2, an increase in the diameter of the modified impeller 160 takes place. With the diameter of the impeller increased to 1.375 inches there is still an insufficient amount of lubricant being pumped as indicated by curve B of FIG. 6.

Figure 3:
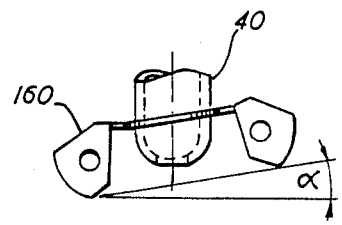
FIG. 3 is a view of the FIG. 1 impeller mounted on the pickup tube at an angle, α.
Figure 6:
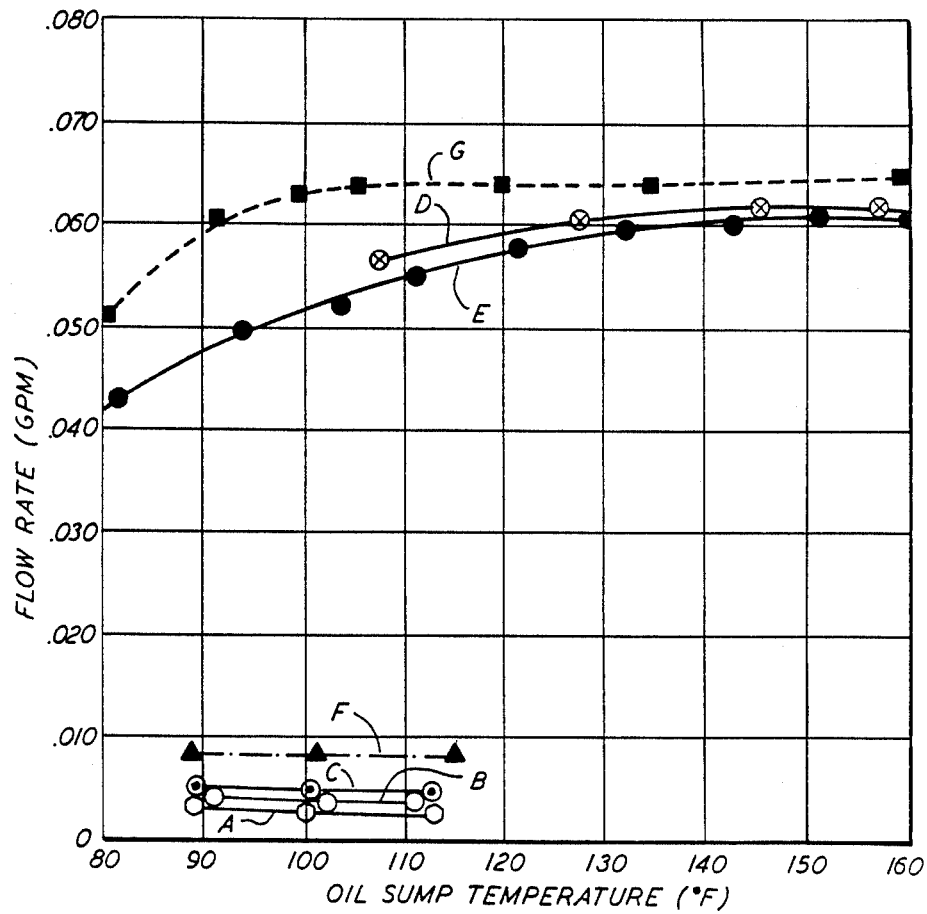
FIG. 6 is a graph of the flow rate in gpm vs. the oil sump temperature in °F. for the impeller of FIGS. 1-5.

When the impeller 60 of FIG. 1 is mounted on pickup tube 40 such that impeller 60 is canted by an angle $\alpha$ from being symmetrical with respect to the axis of rotation of the pickup tube 40, as illustrated in FIG. 3, the pumping results depend upon whether or not $\alpha$ is equal to or greater than a critical angle. Referring to FIG. 6, the curves C, D and E represent the amount of lubricant being pumped at angles of 1.75°, 3.5° and 5.25°, respectively. It will be readily noted from FIG. 6 that somewhere between 1.75° and 3.5° the oil flow goes from insufficient to satisfactory and for the utilized impeller diameter of 1.270 inches the critical axial displacement is on the order of 0.040 to 0.050 inches.

Figure 4:
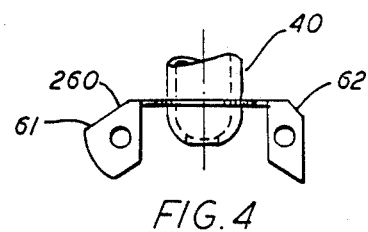
FIG. 4 is a view of a second modified FIG. 1 impeller in which one of the paddles of the impeller has been partially cutaway to reduce its radius.

If the impeller 60 of FIG. 1 is modified to impeller 260 of FIG. 4 by removing a part of paddle 62 so that paddle 61 still has a radius of 0.635 inches but paddle 62 now has a radius of 0.545 inches, the resultant oil flow is insufficient as shown by curve F of FIG. 6.

Figure 5:
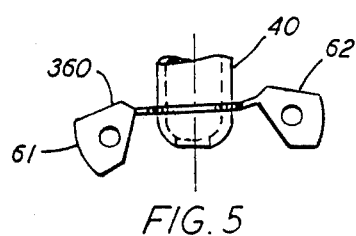
FIG. 5 is a view of a third modified FIG. 1 impeller asymmetrically bent to axially and radially displace one paddle with respect to the other.

If the impeller 60 of FIG. 1 is modified to impeller 360 of FIG. 5 by increasing the radius of paddle 61 to 0.675 inches and increasing the radius of paddle 62 to 0.705 inches by bending paddles 61 and 62 radially outward, an axial asymmetry as well as a radial asymmetry is produced. As shown by curve G of FIG. 6 the resultant oil flow is satisfactory.

From the foregoing it will be noted that the flows are readily separated into two similar patterns for the insufficient and satisfactory flows respectively. Further, it will be noted that radial asymmetry alone or with an insufficient axial asymmetry will produce an insufficient oil flow whereas an axial asymmetry greater than a critical value produces a satisfactory oil flow.

Although preferred embodiments of the present invention have been illustrated and described other modifications will occur to those skilled in the art. It is therefore intended that the present invention is to be limited only by the scope of the appended claims.

What is claimed is:

1. An oil lubrication and noise suppression system comprising:

an oil sump:

a crankshaft rotatable about an axis and defining a centrifugal oil pump:

an oil pickup tube extending into said oil sump and secured to said crankshaft coaxial with said axis and rotatable with said crankshaft about said axis as a unit; and an impeller axially asymmetrically mounted on said pickup tube within said oil sump whereby upon rotation of said crankshaft, said oil pickup tube and said impeller as a unit causes the production of froth and the pumping of oil while preventing the formation of a stable vortex.

2. The oil lubrication and noise suppression system of claim 1 wherein said impeller is additionally radially asymmetrical.

3. The oil lubrication and noise suppression system of claim 1 wherein said axial asymmetry is greater than 1.75°.

4. In an oil lubrication and noise suppression system comprising a crankshaft defining a centrifugal oil pump and a lubricant pickup tube the improvement comprising:

an impeller axially asymmetrically mounted on said pickup tube such that upon rotation of said crankshaft, pickup tube and impeller as a unit oil is pumped and froth is produced without the formation of a stable vortex.

5. The oil lubrication and noise suppression system of claim 4 wherein said axial asymmetry is greater than 1.75°.

* * * * *